(12) United States Patent
Zheng et al.

(10) Patent No.: US 11,081,965 B1
(45) Date of Patent: Aug. 3, 2021

(54) UNIVERSAL INPUT VOLTAGE DETECTION SYSTEM FOR A FLYBACK CONVERTER

(71) Applicant: DIALOG SEMICONDUCTOR INC., Campbell, CA (US)

(72) Inventors: Cong Zheng, Campbell, CA (US); Jianming Yao, Campbell, CA (US); Pan Xin, Campbell, CA (US); Jing Guo, Campbell, CA (US)

(73) Assignee: DIALOG SEMICONDUCTOR INC, Campbell, CA (US)

( * ) Notice: Subject to any disclaimer, the term of this patent is extended or adjusted under 35 U.S.C. 154(b) by 0 days.

(21) Appl. No.: 16/835,167

(22) Filed: Mar. 30, 2020

(51) Int. Cl.
*H02M 3/335* (2006.01)

(52) U.S. Cl.
CPC ..... *H02M 3/3353* (2013.01); *H02M 3/33507* (2013.01)

(58) Field of Classification Search
None
See application file for complete search history.

(56) References Cited

U.S. PATENT DOCUMENTS

| | | | | | |
|---|---|---|---|---|---|
| 5,717,578 | A * | 2/1998 | Afzal | ................ | H02M 3/33507 320/111 |
| 8,208,236 | B2 * | 6/2012 | Lin | .................... | H02M 3/33523 361/93.1 |
| 8,279,631 | B2 * | 10/2012 | Yang | ................. | H02M 3/33507 363/20 |
| 9,263,954 | B2 * | 2/2016 | Strijker | ............. | H02M 3/33507 |
| 9,281,751 | B2 * | 3/2016 | Lin | .................... | H02M 3/33523 |
| 9,331,589 | B2 * | 5/2016 | Shi | ..................... | H02M 3/33523 |
| 9,537,404 | B2 | 1/2017 | Li et al. | | |
| 9,660,539 | B2 * | 5/2017 | Ren | ................... | H02M 3/33507 |
| 10,277,133 | B2 * | 4/2019 | Oe | ........................ | H02M 1/143 |
| 2010/0232188 | A1 * | 9/2010 | Hayasaki | ........... | H03K 17/0822 363/21.15 |
| 2019/0207523 | A1 * | 7/2019 | Oe | ......................... | H02M 1/08 |
| 2020/0177085 | A1 * | 6/2020 | Mizoe | .............. | H02M 3/33523 |

* cited by examiner

*Primary Examiner* — Jeffrey A Gblende
*Assistant Examiner* — Henry E Lee, III
(74) *Attorney, Agent, or Firm* — Haynes and Boone, LLP

(57) ABSTRACT

Disclosed is a universal input voltage detection system for a flyback converter having a transformer coupled between an input and an output of the flyback converter. The transformer includes a primary winding coupled to the input of the flyback converter to receive an input voltage and a secondary winding coupled to the output of the flyback converter. The universal input voltage detection system comprises a controller, coupled to a switch, at a primary winding side of the transformer. The switch is coupled to the primary winding of the transformer and a current through the primary winding is generated when the switch is turned on. The controller is configured to operate in either continuous conduction mode (CCM) or discontinuous conduction mode (DCM) and indirectly detect the input voltage to the flyback converter based on the current through the primary winding generated while the switch is turned on.

20 Claims, 8 Drawing Sheets

UNIVERSAL INPUT VOLTAGE DETECTION SYSTEM FOR A FLYBACK CONVERTER

TECHNICAL FIELD

This application relates generally to a power supply and more particularly to the detection and monitoring of the magnitude and shape of the input voltage waveform to indirectly detect the input voltage for a switching power converter.

BACKGROUND

Flyback converters are designed to receive unregulated alternating current (AC) input power and provide regulated outputs to loads such as electronic devices. Typically, a low frequency AC power source (e.g., 90-270 Volts AC (VAC) at 50-65 Hertz (Hz)) is rectified to provide an unregulated direct current (DC) power source, which is input to a power conversion stage of the flyback converter. In turn, the power stage provides a regulated DC power source to the load.

The rectifier converts an AC input voltage from the AC input source into an unregulated DC input voltage. The power conversion stage is coupled to receive the unregulated DC input voltage from the rectifier and, in turn, provide a regulated DC output voltage to the load. The rectifier may be a bridge rectifier that provides full-wave rectification of the AC input voltage. Additionally, the unregulated DC input voltage may be filtered with a bulk capacitor that is coupled to the output of the rectifier and the input of the power conversion stage.

The power conversion stage includes a transformer that provides galvanic isolation between its primary side and its secondary side. The power conversion stage also includes a primary-side switch for controlling a primary winding current conducted by the primary winding of the transformer. A switch controller controls the on-time and the off-time of the primary-side switch to regulate the power delivery to a load at the secondary-side of the transformer. Energy from the unregulated DC input voltage is stored in the gap of the transformer when the primary-side switch is on and is transferred to the load when the primary-side switch is off. The switch controller controls the switch to be turned on or off with on-times or off-times that are adjusted at the operating frequency of the power converter according to the adopted regulation scheme, such as pulse width modulation and/or pulse frequency modulation, to regulate a DC output voltage provided to the load. Accordingly, the on-time and off-time of the primary-side switch may be modified by the controller based upon a feedback signal (e.g., reflecting the output voltage) to provide the regulated DC output voltage provided to the load.

In many cases, flyback converters are required to operate over a "universal input range," allowing for the worldwide operation of the electronic devices. Variation in the AC input can lead to changes in the regulated DC output voltage provided to the load for a given on-time and off-time of the switch. FIG. 1A illustrates waveforms for an example universal AC input operating range ($V_{IN-AC}$) that may fluctuate between 90 VAC to 270 VAC. As described above, a bridge rectifier converts the AC input $V_{IN-AC}$ into an unregulated DC input voltage and a bulk capacitor filters the unregulated DC input voltage. FIG. 1B illustrates waveforms for an unregulated DC input voltage operating range ($V_{IN-DC}$) corresponding to the AC input voltage $V_{IN-AC}$ range of FIG. 1A. The resulting DC input voltage of the power conversion stage effectively extends from a minimum value ($V_{IN-MIN}$), at the zero crossing of the AC input voltage while operating at 90 VAC, to a maximum value ($V_{IN-MAX}$), at the peak of the AC input waveform while operating at 270 VAC.

To insure proper operation, it is desirable for a flyback converter to monitor the DC input voltage to the power stage. In conjunction with monitoring the DC input voltage, additional protection and safety features may be included should the DC input voltage deviate from the specified operating range (e.g., exceed $V_{IN-MAX}$ or drop below $V_{IN-MIN}$) and/or should the flyback converter has become uncoupled from the AC input voltage source.

FIG. 2 illustrates an example block diagram of a conventional flyback converter 200 in which the waveforms of an unregulated DC input voltage 202 are consistent with those shown in FIG. 1B. As shown, a bridge rectifier 204 is coupled to the AC mains (not shown) and input bulk capacitor 206 is coupled across the output of the bridge rectifier 204 to filter the unregulated DC input voltage 202. The unregulated DC input voltage 202 is input to the power conversion stage 208, which includes a transformer 210, a controller 212, and a primary-side switch SW. The controller 212 regulates a DC output voltage 214 across a load 216 by controlling the on-time and off-time (e.g., the duty cycle) of the primary-side switch SW. The controller 212 senses the unregulated DC input voltage 202 at a voltage sense pin $V_{IN}$ ("$V_{IN}$ pin"). Monitoring of the magnitude of the unregulated DC input voltage 202 at the $V_{IN}$ pin of the controller 212 enables detection of a brown-out condition and a loss of AC source condition (e.g., due to a decoupling of the AC source from the rectifier 204).

A brown-out condition represents potentially damaging conditions for flyback converter 200, especially when operating in areas where AC sources are unreliable. In brown-out conditions, the AC input voltage drops to a level that is below the specified operating range (e.g., 90-270 VAC). For example, in areas where the AC input voltage range is 90 VAC to 130 VAC, brown-out conditions exist when the AC input voltage drops below 90 VAC. As a result, the unregulated DC input voltage 202 input to the power conversion stage 208 may drop below the specified operating range. Continued operation in brown-out conditions can lead to a number of undesirable results, including increased thermal conditions of flyback converter 200 components, component failure and damage, and damage to the load 216 due to loss of regulation of the regulated DC output voltage 214. Typically, a brown-out condition is brief, lasting only a few AC cycles. However, when brown-out conditions persist over longer periods of time, the power supply may suffer permanent damage.

Unfortunately, such direct sensing of the DC input voltage 202 at $V_{IN}$ pin of controller 212 increases costs as the controller 212 will need high-voltage circuitry to properly process the DC input voltage 202. As such, there is a need in the art for an improved flyback power converter that does not require the direct sensing of the DC input voltage.

SUMMARY

Disclosed is a universal input voltage detection system for a flyback converter having a transformer coupled between an input and an output of the flyback converter. The transformer includes a primary winding coupled to the input of the flyback converter to receive an input voltage and a secondary winding coupled to the output of the flyback converter. The universal input voltage detection system includes; a first comparator configured to assert a first comparator output signal responsive to a sense resistor voltage being greater than an adaptive threshold voltage, wherein the sense resistor voltage is produced by a primary-winding current through a sense resistor; a second comparator configured to assert a second comparator output signal responsive to the sense resistor voltage being greater than a peak primary current threshold voltage, wherein the adaptive threshold voltage equals the peak primary current threshold voltage minus an offset; a voltage threshold time detector configured to determine a threshold time from the assertion of the first comparator output signal to the assertion of the second comparator output signal; and a controller for controlling a cycling of a primary-side switch to regulate an output voltage for the flyback converter, wherein the controller is configured to cycle off the primary-side switch responsive to the assertion of the second comparator output signal; and wherein the controller is further configured during a discontinuous conduction mode to: determine a voltage gradient over time of the sense resistor voltage from the threshold time, and determine an input voltage to the flyback converter from the voltage gradient over time and a magnetizing inductance of a transformer for the flyback converter.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
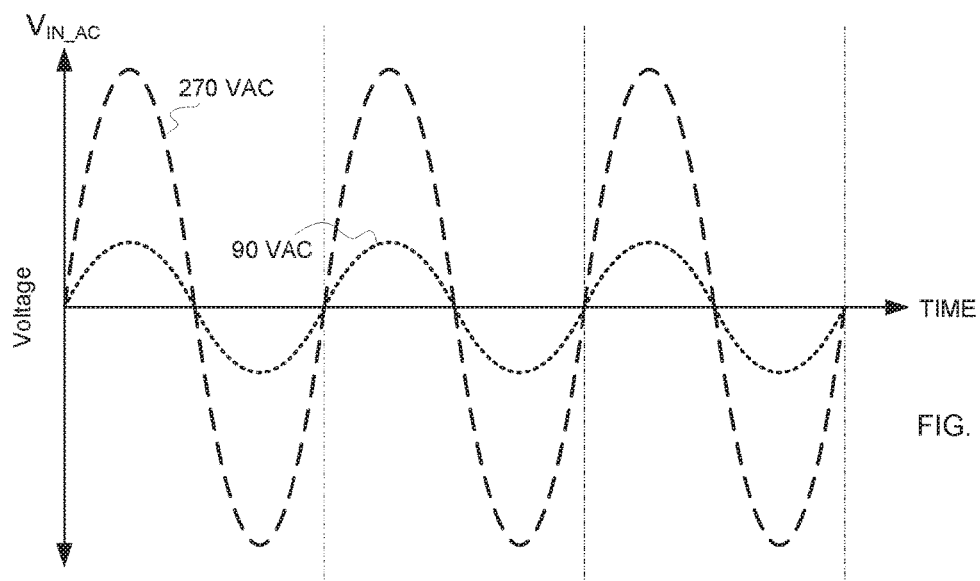
FIG. 1A illustrates waveforms for a known example of a universal AC input operating range ($V_{IN-AC}$) between 90 VAC to 270 VAC.
Figure 1B:
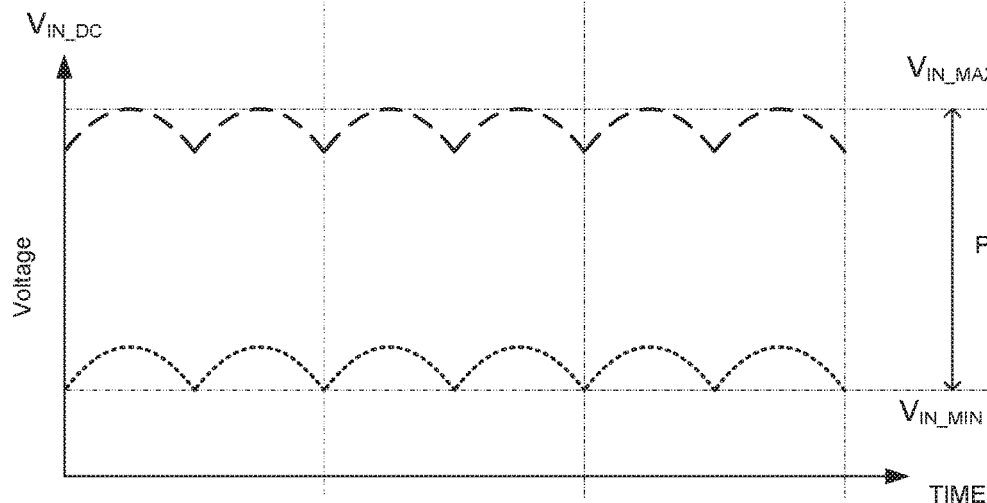
FIG. 1B illustrates waveforms for a known example of an unregulated DC operating range corresponding to the $V_{IN-AC}$ range of FIG. 1A.
Figure 2:
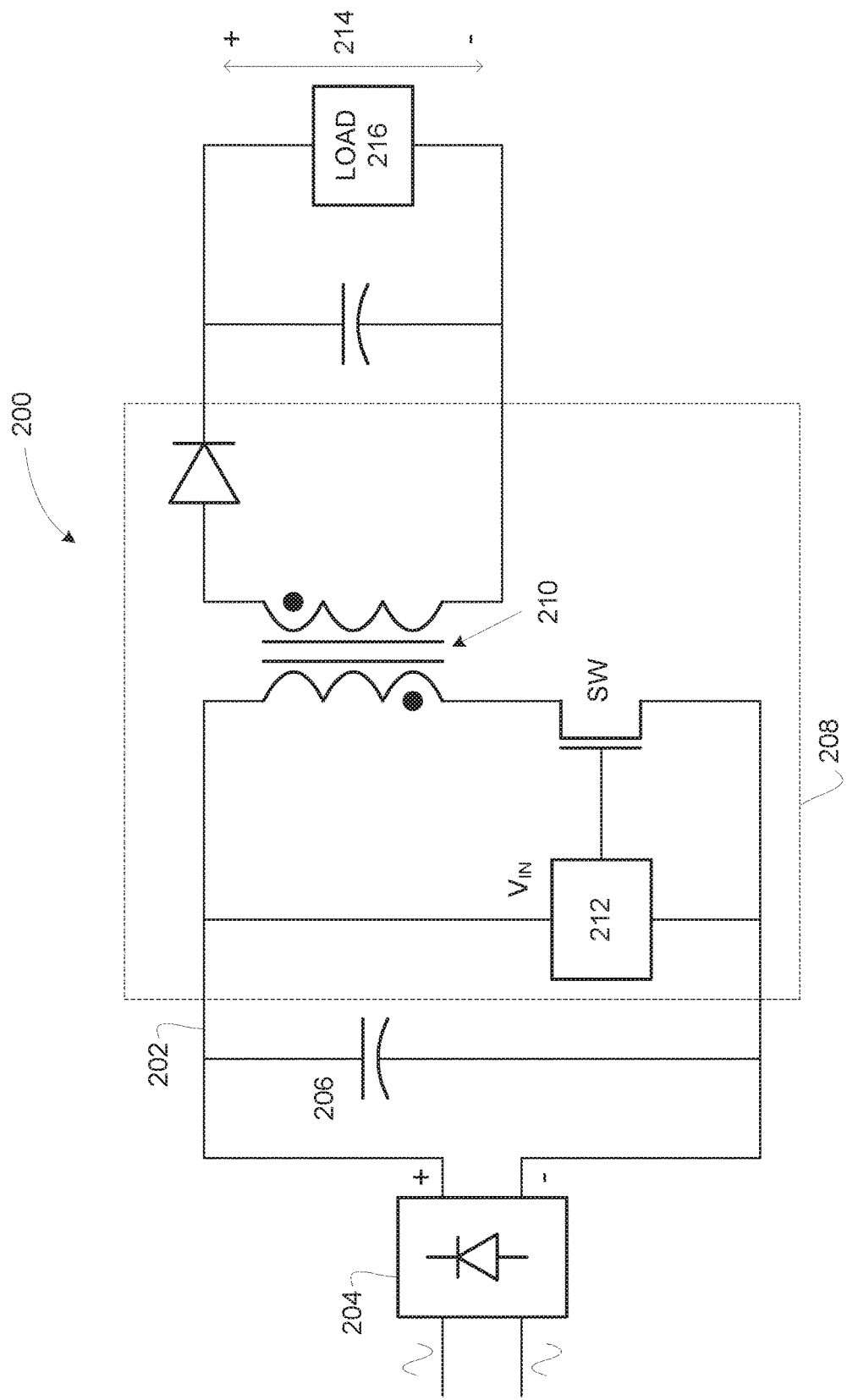
FIG. 2 illustrates a known example of a block diagram of a flyback power supply where the unregulated DC voltage waveforms are consistent with those shown in FIG. 1B.

A universal input voltage detection system for a flyback converter is provided. The flyback converter includes a transformer having a primary winding connected to a primary-side power switch and a secondary winding coupled to an output of the flyback converter. The universal input voltage detection system comprises a controller for controlling a cycling of the power switch. A primary-winding current conducts through the primary winding when controller switches on the power switch. The controller is configured to operate in either a continuous conduction mode (CCM) or a discontinuous conduction mode (DCM). In both these modes, the controller indirectly detects the input voltage to the flyback converter based on the primary-winding current. The indirect detecting of the input voltage avoids the need for relatively-costly high-voltage circuitry such as would be required for the direct sensing of the input voltage through the dedicated voltage sense pin $V_{IN}$ of the controller 212 described in relation to FIG. 2.

Figure 3:
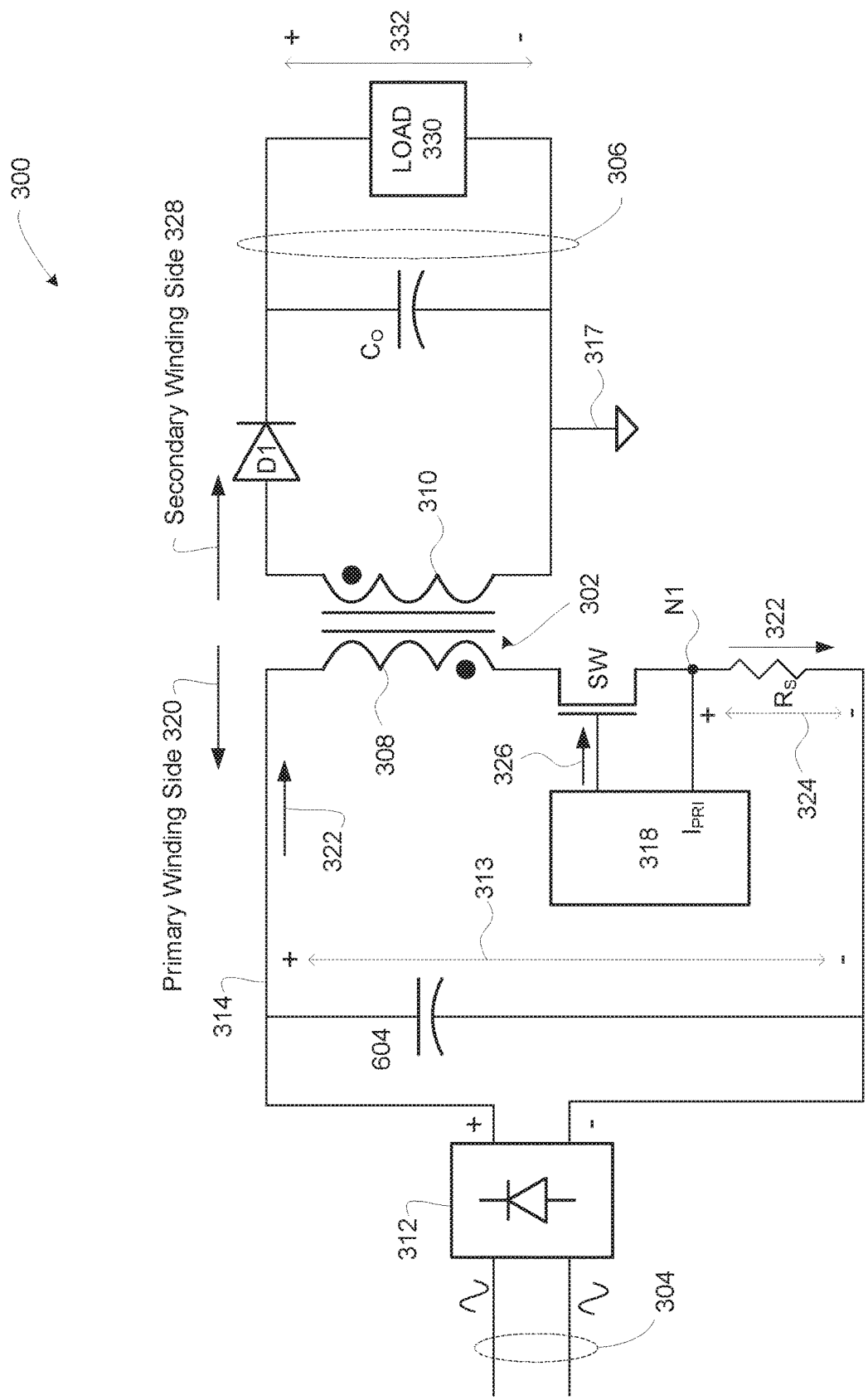
FIG. 3 illustrates an example of an embodiment of a flyback power converter with indirect sensing of the unregulated DC voltage.

Turning now to FIG. 3, an example flyback converter 300 (also referred to as a flyback power converter or a switching power converter) with indirect sensing of a DC input voltage 302 is shown in accordance with the present disclosure. A controller 318 in flyback converter 300 includes the universal input voltage detection system. The flyback power converter 300 includes a transformer 302 coupled between an input 304 and an output 306 of the flyback converter 300. The transformer 302 includes a primary winding 308 coupled to the input 304 of the flyback converter 300 to receive an input voltage and a secondary winding 310 coupled to the output 306 of the flyback converter 300.

In general, an alternating current (AC) voltage signal from an AC power source (not shown) is injected into the input 304 of the flyback converter 300 and received at a rectifier 312. The rectifier 312, in turn, provides a direct current (DC) input voltage on an input rail 314 to the primary winding 308 of the transformer 302. Typically, a bulk capacitor 316 is coupled from the input rail 314 to ground.

Controller 318 controls the cycling of a primary-side power switch SW (e.g, a MOSFET) on a primary winding side 320 of the transformer 302. The power switch SW conducts a primary-winding current (illustrated by arrow 322) into a sense resistor RS coupled between the power switch SW and ground. The controller 318 is configured to operate in either a continuous conduction mode (CCM) or a discontinuous conduction mode (DCM) of operation and is further configured to indirectly detect the input voltage 313 to the flyback converter 300 based on a waveform for the primary-winding current. To control the off-time of power switch S2 in each switching cycle, controller 318 detects a sense resistor voltage 324 at a node N1. The sense resistor voltage is produced by the primary-winding current and a resistance of the sense resistor $R_S$. To control the cycling of power switch SW, controller 318 generates a drive signal 326.

Power is stored in the transformer 302 while the switch SW is turned on during because a diode D1 at a secondary winding side 328 becomes reverse biased to prevent a secondary-winding current from conducting. In alternative embodiments, diode D1 may be replaced by a synchronous rectifier switch transistor to control the rectification of the secondary-winding current. The power stored in the transformer 302 is then transferred to a load 330 across an output capacitor $C_o$ (coupled to ground 317) when the power switch SW is turned off during the "OFF" cycles because the diode D1 becomes forward biased (or from the switching on of a synchronous rectifier switch transistor). In each cycle of power switch S2, controller 318 monitors the sense resistor voltage. When the sense resistor voltage reaches a peak primary current threshold voltage, controller 381 switches off the power switch SW. The peak primary current threshold voltage thus determines a peak primary-winding current for each cycle of power switch SW. During a pulse width modulation (PWM) mode of operation, controller 318 uses a feedback signal (not shown) derived from the output voltage 332 to determine the peak primary current threshold voltage. As controller 318 increases or decreases the peak primary current threshold voltage, the peak primary winding current increases or decreases accordingly. In a pulse frequency mode (PFM) of operation, the peak primary current threshold voltage is fixed. In PFM operation, controller 318 increases or decreases the switching frequency for power switch SW to regulate the output voltage 332.

Note that controller 318 (unlike the controller 212 of FIG. 2) does not include a dedicated voltage sense pin $V_{IN}$ to directly sense the input voltage. Consequently, the controller 318 does not directly sense the input voltage. Instead, the controller 318 determines the magnitude of the input voltage 314 from the waveform of the primary-winding current to provide an indirect, real-time measurement of the input voltage without requiring costly sensing devices and circuits.

Figure 4:
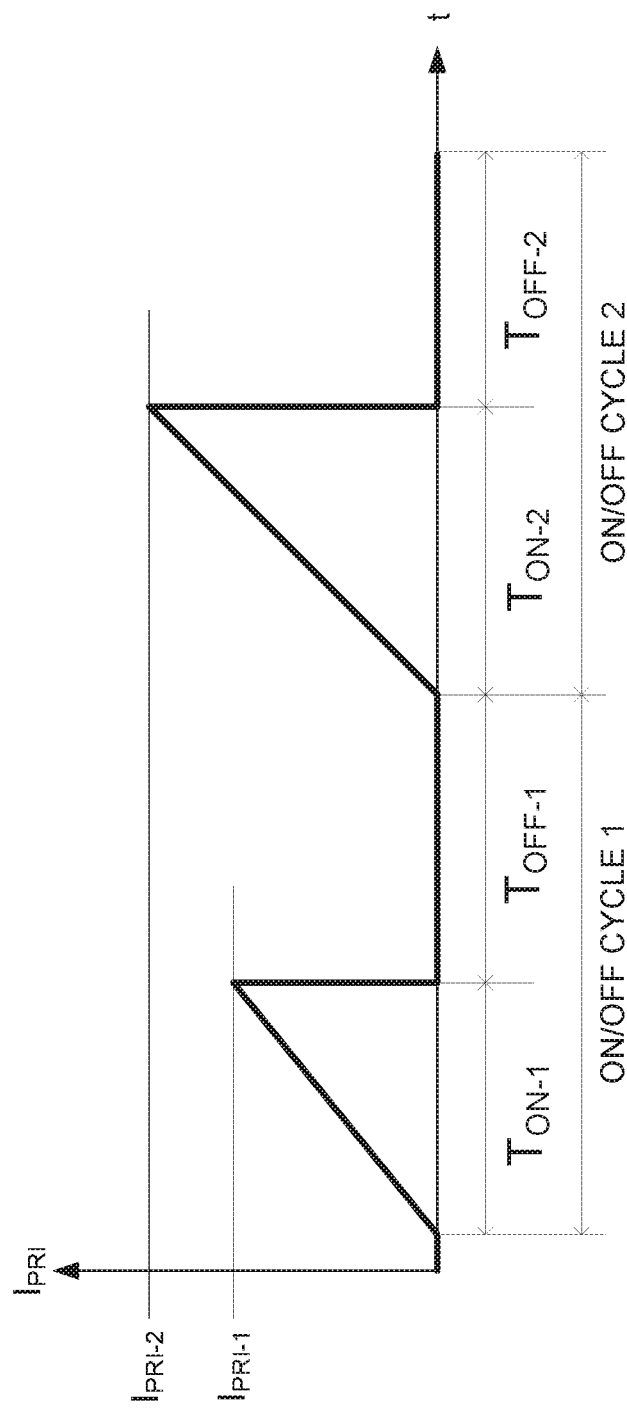
FIG. 4 illustrates example operating waveforms of current through the primary-side of a transformer of a flyback power converter.

With regard to such indirect measurement of the input voltage, it is known for a controller such as controller 318 to indirectly measure or determine the input voltage during a discontinuous conduction mode (DCM) of operation. For example, FIG. 4 illustrates some operating waveforms of the primary-winding current during DCM operation. As shown, a peak primary-winding current ($I_{PK}$) for a given switching cycle may increase or decrease based on the $T_{ON}$ and $T_{OFF}$ times of the primary-side switch SW during the different cycles (and also depending upon the input voltage). The input voltage may then be indirectly determined from the peak currents through the primary winding 308 using the relationship $$V_{IN-DC} = \frac{I_{PK} \cdot L_m}{T_{ON}}.$$

Here, $L_m$ is the magnetizing inductance of transformer 302, $T_{ON}$ is the on-time of the primary-side switch SW, and $I_{PK}$ is the peak of the primary winding current 322. But such a conventional indirect determination of the input voltage is not applicable to operation of flyback converter 300 in a continuous conduction mode (CCM) of operation as will be further explained herein.

Figure 5:
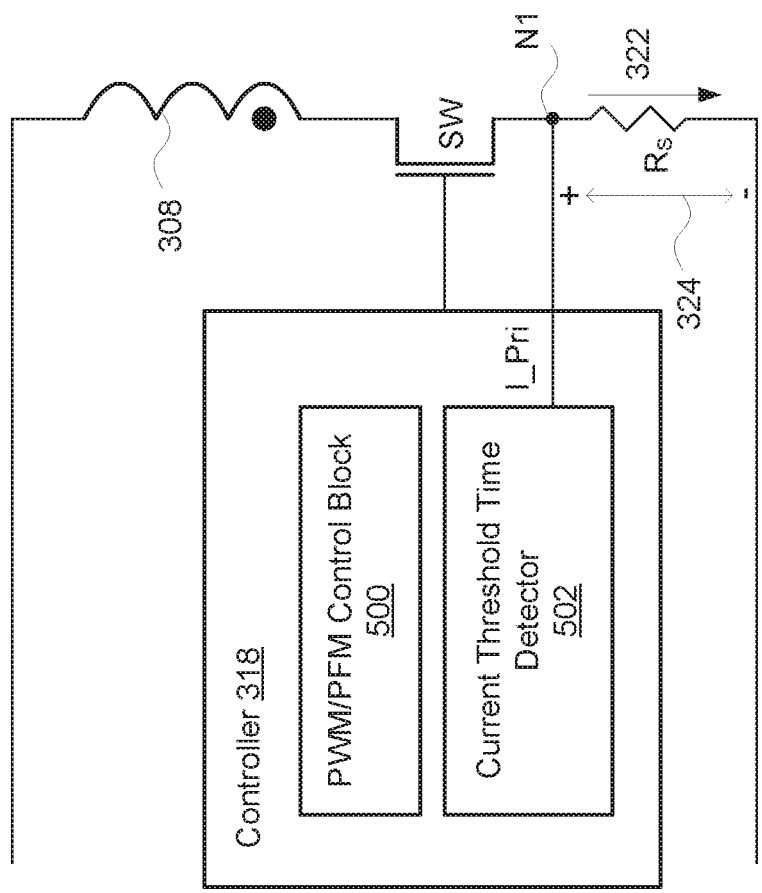
FIG. 5 is a block diagram of an example of an embodiment of the controller (shown in FIG. 3) in accordance with the present disclosure.
Figure 6:
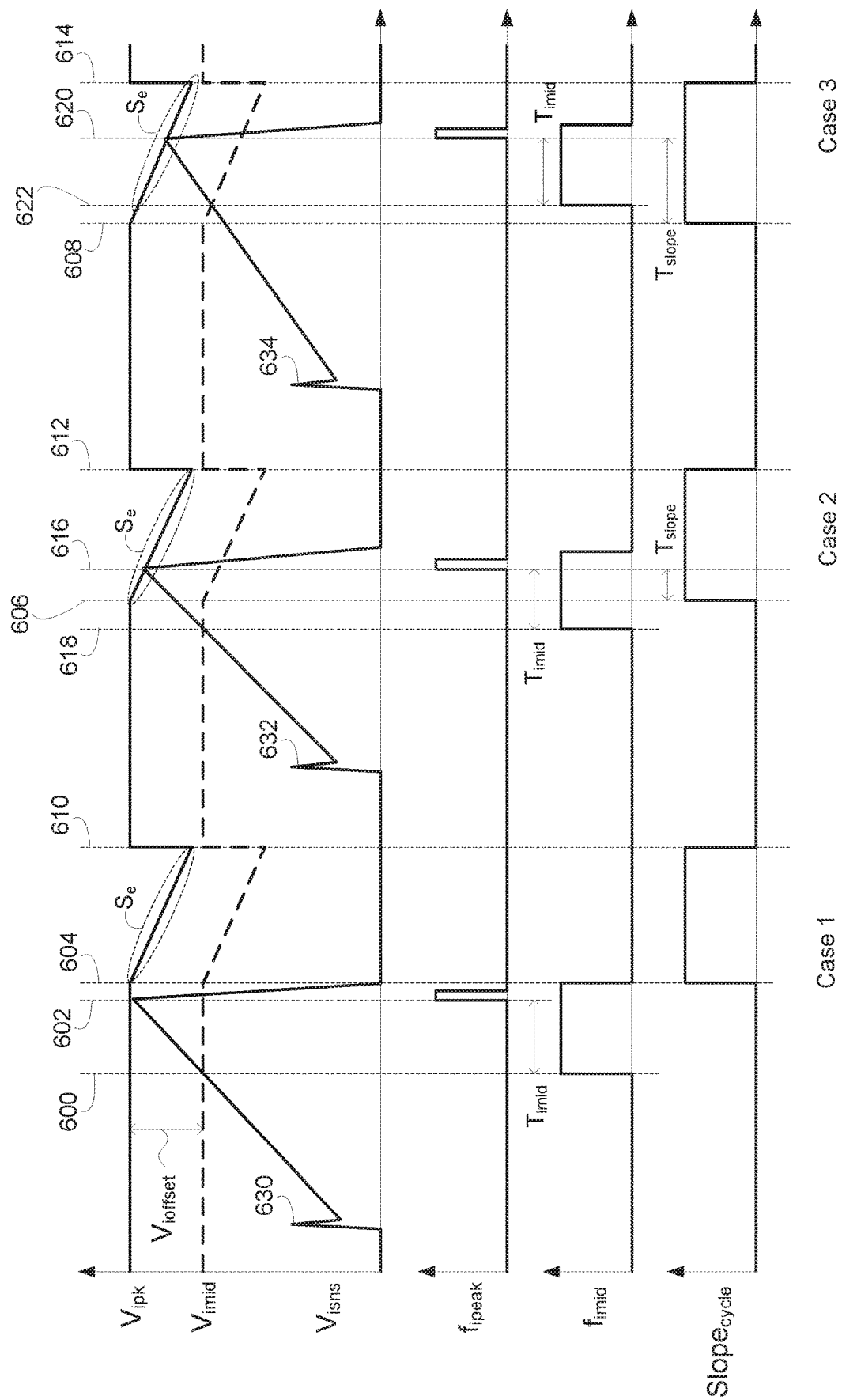
FIG. 6 illustrate plots of examples of waveforms associated with the operation of the universal input voltage detection system in accordance with the present disclosure.

To provide a CCM functionality, some aspects of controller 318 for indirect measurement of the input voltage during CCM operation are shown in FIG. 5. As shown, the controller 318 includes a PWM/PFM control block 500 which adjusts the switching frequency in PFM and the primary peak current in PWM modes, and a voltage threshold time detector 502. The voltage threshold time detector 502 is configured to measure a threshold time $T_{imid}$ that is equal to a difference between a first time when the sense resistor voltage is equal to an adaptive threshold voltage and a second time when the sense resistor voltage is equal to the peak primary current threshold voltage. The adaptive threshold equals the peak primary current threshold voltage minus an offset. There are three scenarios for the use of the threshold time $T_{imid}$ to indirectly determine the input voltage. These three scenarios may be better appreciated with a consideration of some example switching waveforms for flyback converter 300 during CCM operation as shown in FIG. 6. The waveforms include a plot of the peak primary current threshold voltage ($V_{ipk}$), a plot of the adaptive threshold voltage ($V_{imid}$), a plot of the sense resistor voltage ($V_{isns}$), a plot of a flag signal ($f_{ipeak}$) that is briefly asserted when the sense resistor voltage $V_{isns}$ rises to equal the peak primary current threshold voltage, a plot of a flag signal ($f_{imid}$) that is asserted when the sense resistor voltage $V_{isns}$ rises to equal the adaptive threshold voltage $V_{imid}$ and that is de-asserted when the sense resistor voltage $V_{isns}$ falls to approximately 0 V, and a plot of a slope compensation flag signal ($Slope_{cycle}$) that is asserted during a slope compensation period. As known in the flyback converter arts, slope compensation is performed to decrease the peak primary winding current (and thus decrease the peak primary current threshold voltage $V_{ipk}$) for better stability. The ON time for any given cycle of the power switch SW has a maximum value or duty cycle. From the start of the ON time, the slope compensation begins after a certain portion of the maximum ON time has expired. The slope compensation then commences and continues until a maximum slope compensation time. The slope compensation period thus coincides with the assertion of the slope compensation flag signal $Slope_{cycle}$. During each slope compensation period, the maximum sense resistor voltage $V_{ipk}$ is reduced according to a slope $S_e$ (which may also be designated as a rate of decline).

The three scenarios occur with respect to the slope compensation period. In a first scenario (designated as case 1), the sense resistor voltage $V_{isns}$ rises to equal the peak primary current threshold voltage $V_{ipk}$ prior to the commencement of the slope compensation period. In the two remaining scenarios (designated as case 2 and case 3), the sense resistor voltage $V_{isns}$ rises to equal the peak primary current threshold voltage $V_{ipk}$ during the slope compensation period. The distinction between cases 2 and 3 depends a time $T_{slope}$ of each slope compensation period and the threshold time $T_{imid}$. The portion $T_{slope}$ begins with the start of the slope compensation period and ends when the sense resistor voltage $V_{isns}$ rises to equal the peak primary current threshold voltage $V_{ipk}$. In case 2, the time $T_{slope}$ is less than the threshold time $T_{imid}$. Conversely, the time $T_{slope}$ is greater than the threshold time $T_{imid}$ in case 3.

Specifically, the slope compensation period is shown to start at a time 604 for case 1, at a time 606 for case 2, and at a time 608 for case 3. The slope compensation period ends at times 610, 612, and 614 for cases 1, 2, and 3 respectively. In case 1, the sense resistor voltage crosses the adaptive threshold at a time 600 and reaches the peak primary current threshold voltage at a time 602. In case 2, the sense resistor voltage crosses the adaptive threshold at a time 618 and reaches the peak primary current threshold voltage at a time 616. Finally, in case 3, the sense resistor voltage crosses the adaptive threshold at a time 622 and reaches the peak primary current threshold voltage at a time 620. The values of the time threshold $T_{imid}$ varies between these three cases, where $T_{imid}$ is equal to the time difference between time 602 and time 600 for case 1. In case 2, $T_{imid}$ is equal to the time difference between time 616 and time 618. Finally, in case 3, $T_{imid}$ is equal to the time difference between time 620 and time 622.

As such, the scenario in case 1 describes the situation in which the slope compensation on-time does not start until after the sense resistor voltage $V_{isns}$ has reached the peak primary current threshold voltage $V_{ipk}$. Prior to the slope compensation on-time in case 1, the peak primary current threshold voltage $V_{ipk}$ is static as the slope compensation has not started. In cases 2 and 3, the slope compensation period on-time has occurred before the sense resistor voltage $V_{isns}$ has reached the peak primary current threshold voltage $V_{ipk}$. As discussed earlier, the length of the slope compensation $T_{slope}$ as compared to the length of the threshold time $T_{imid}$ distinguishes between cases 2 and 3. The length of the threshold time or period $T_{imid}$ is equal to when the flag $f_{imid}$ is asserted to when flag $f_{ipeak}$ is asserted. The length of the slope period $T_{slope}$ extends from when the slope compensation flag $Slope_{cycle}$ is asserted to when the flag $f_{ipeak}$ is asserted. Thus, the sense resistor voltage $V_{isns}$ in case 2 has reached the peak primary current threshold voltage $V_{ipk}$ in a relatively short time after the slope compensation period has started, whereas in case 3, the sense resistor voltage $V_{isns}$ has reached peak primary current threshold voltage $V_{ipk}$ in a relatively long time after the slope compensation period has started. In relation to case 2 and case 3, the time from when the slope compensation period starts (i.e., time 606 and time 608) to decrease the peak primary current threshold voltage $V_{ipk}$ according a slope profile (rate of decrease) $S_e$ to when the sense resistor voltage $V_{isns}$ equals the peak primary current threshold voltage $V_{ipk}$ (i.e., at time 616 and time 620, respectively) is defined as the $T_{slope}$ period. In FIG. 6, the descending slope profile $S_e$ is shown between times 604 and 610 in case 1, between times 606 and 612 in case 2, and between times 608 and 614 in case 3, respectively.

In these examples, the adaptive threshold voltage $V_{imid}$ is equal to the difference in the peak primary current threshold voltage $V_{ipk}$ and an adaptive voltage offset ($V_{ioffset}$). This relationship may be written as follows $$V_{ioffset} = V_{ipk} - V_{imid}.$$

The voltage gradient over time of the sense resistor voltage $V_{isns}$ is equal to the derivative of the sense resistor voltage $V_{isns}$ over time $$\left(i.e., \frac{dV_i}{dt}\right)$$

As such, the voltage gradient over time of the sense resistor voltage $$V_{isns} \frac{dV_i}{dt}$$

is equal to the following for case 1:

$$\frac{dV_i}{dt} = \frac{V_{ioffset}}{T_{imid}},$$

where the voltage gradient over time $$\frac{dV_i}{dt}$$

is equal to the adaptive voltage offset $V_{ioffset}$ divided by the threshold time $T_{imid}$. For case 2:

$$\frac{dV_i}{dt} = \frac{V_{ioffset} - T_{slope} \cdot S_e}{T_{imid}},$$

where threshold time $T_{imid}$ is greater than the slope period $T_{slope}$ and the voltage gradient over time $$\frac{dV_i}{dt}$$

is equal to the difference of the adaptive voltage offset $V_{ioffset}$ and the slope period $T_{slope}$ multiplied by slope profile $S_e$, where the difference is divided by the threshold time $T_{imid}$. For case 3:

$$\frac{dV_i}{dt} = \frac{V_{ioffset} - T_{imid} \cdot S_e}{T_{imid}},$$

where the slope period $T_{slope}$ is greater than the threshold time $T_{imid}$ and the voltage gradient over time $$\frac{dV_i}{dt}$$

is equal to the difference of the adaptive voltage offset $V_{ioffset}$ and the threshold time $T_{imid}$ multiplied by slope profile $S_e$, where the difference is divided by the threshold time $T_{imid}$. In general, case 2 and case 3 may be described by a universal relationship defined as $$\frac{dV_i}{dt} = \frac{V_{ioffset} - \min(T_{islope}, T_{imid}) \cdot S_e}{T_{imid}},$$

where the voltage gradient over time is equal to the difference of the adaptive voltage offset and a minimum time value divided by the threshold time. The minimum time value is equal to the minimum of either the slope period and the threshold time. Using these relationships, the input voltage may be calculated as the product of the voltage gradient over time $$\frac{dV_i}{dt}$$

and the magnetizing inductance $L_m$:

$$V_{in} = L_m \cdot \frac{dV_i}{dt}.$$

Note that a relatively-large adaptive voltage offset $V_{ioffset}$ generally results in better calculation resolution and accuracy. But if the adaptive voltage offset $V_{ioffset}$ is too large, then initial glitches in the sense resistor voltage would undesirably cross the adaptive threshold voltage $V_{imid}$. For example, the sense resistor voltage has an initial glitch 630 in case 1, a glitch 632 in case 2, and a glitch 634 in case 3. The adaptive voltage offset $V_{ioffset}$ may be thus be increased for greater accuracy but should not be increased such that these glitches produce a crossing of the adaptive threshold voltage $V_{imid}$. As an example, the adaptive voltage offset $V_{ioffset}$ may be selected based on the threshold time $T_{imid}$ and $T_{on}$ using the following: initially use a large value for the adaptive threshold voltage $V_{imid}$ by default; if $T_{on}-T_{imid}$ is less than or equal to a blanking time ($T_{blanking}$), use a small value for the adaptive threshold voltage $V_{imid}$; and if $T_{on}-T_{imid}$ is greater than or equal to the blanking time $T_{blanking}$ plus a hysteresis time ($T_{hysteresis}$), use a large value for the adaptive threshold voltage $V_{imid}$. Again, $T_{ON}$ is the on-time of the power switch SW described earlier. Note that the existence of a blanking time following the switching off of the power switch SW is a known technique so that the glitches 630, 632, and 634 do not cause the sense resistor voltage to mistakenly rise above the peak primary current threshold voltage $V_{ipk}$. The blanking time thus extends over a relatively-brief period that begins when the power switch SW is switched off so that the glitches are not considered when comparing the sense resistor voltage to the peak primary current threshold voltage $V_{ipk}$.

Figure 7:
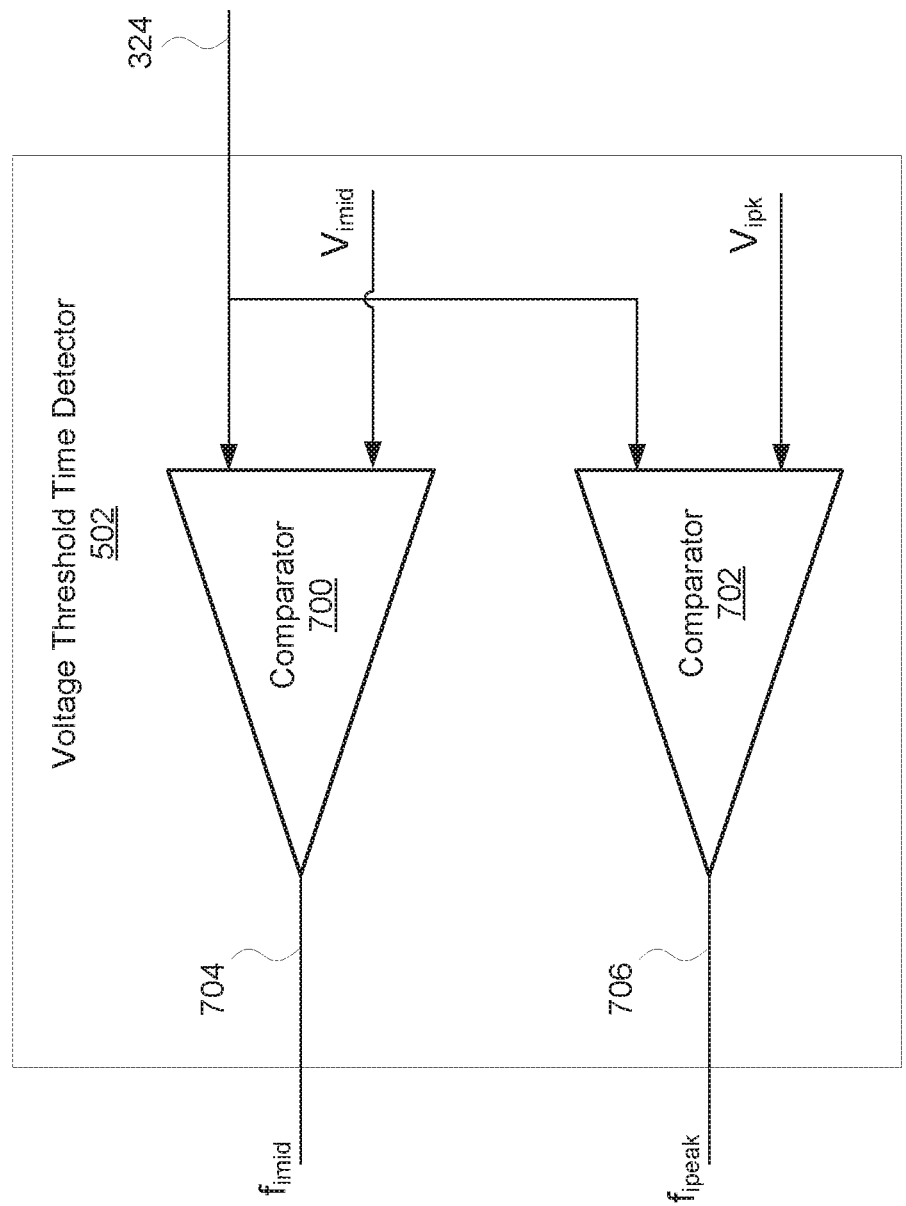
FIG. 7 is a block diagram of an example of an embodiment of voltage threshold time detector shown in FIG. 5.

Turning to FIG. 7, a block diagram is shown of an example voltage threshold time detector 502 in accordance with the present disclosure. The voltage threshold time detector 502 includes a threshold detector such as a first comparator 700. First comparator 700 is configured to determine when the sense resistor voltage reaches the adaptive threshold voltage $V_{imid}$. When the sense resistor voltage reaches the adaptive threshold voltage $V_{imid}$, an output 704 of first comparator 700 goes high. Voltage threshold time detector 502 may include a counter (not illustrated) that begins counting responsive to cycles of a clock signal in response to the assertion of the output signal from first comparator 700 to begin timing the threshold time $T_{imid}$. A second comparator 702 compares the sense resistor voltage to the peak primary current threshold voltage $V_{ipk}$. An output signal 706 from second comparator 702 will thus be asserted when the sense resistor voltage rises to equal the peak primary current threshold voltage $V_{ipk}$. The counter may then finish timing the threshold time or period $T_{imid}$ responsive to the assertion of the output signal from second comparator 702. In addition, note that controller 318 may also use the assertion of the second comparator output signal to control when the power switch SW is cycled off in each cycle of the power switch SW.

Figure 8:
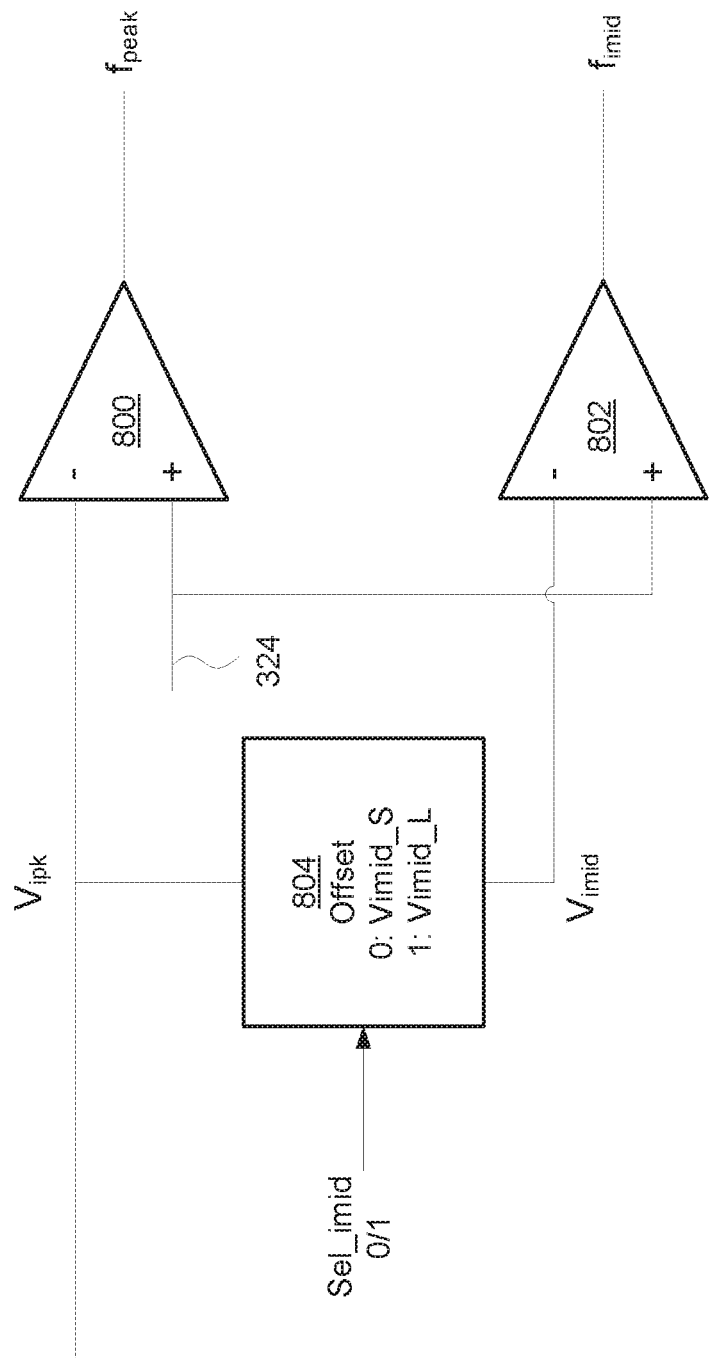
FIG. 8 is a block diagram of a subsystem is shown for producing the pulse of the flag $f_{ipeak}$ and the pulse of the flag $f_{imid}$ is in accordance with the present disclosure.

In FIG. 8, a block diagram of a subsystem for producing the flag $f_{ipeak}$ and the flag $f_{imid}$ is shown in accordance with the present disclosure. The subsystem may be integrated into controller 318 and may include a first threshold detector (first comparator) 800, a second threshold detector (second comparator) 802, and an offset circuit 804 coupled to both the first threshold detector 800 and the second threshold detector 802.

The first threshold detector 800 is configured to compare the sense resistor voltage (324) to the peak primary current threshold voltage $V_{iPK}$. Similarly, the second threshold detector 802 is further to compare the sense resistor voltage to the adaptive threshold voltage $V_{imid}$. In response to receiving a binary threshold selection signal from the controller 318, an offset circuit 804 sets the adaptive threshold voltage $V_{imid}$ to a high value (Vimid_L) that is close in magnitude to the peak primary current threshold voltage $V_{iPK}$ or to a low value (Vimid_S) that is close in magnitude to the initial glitch voltage.

The controller 318 is further configured to set the binary threshold select signal to a first value (e.g., 0) corresponding to setting the adaptive threshold voltage $V_{imid}$ to the high value (Vimid_L) when the difference between the power switch SW turn-on duration and the threshold time $T_{imid}$ is greater than or equal to the blanking time plus the hysteresis time. The controller 318 is also configured to set the binary threshold select signal to a second value (e.g., 1) corresponding to setting the adaptive threshold voltage $V_{imid}$ to the low value (Vimid_S) when the difference between the power switch SW turn-on duration and the threshold time $T_{imid}$ is less than or equal to the blanking time.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

What is claimed is:

1. A universal input voltage detection system for a flyback converter comprising:
    a first comparator configured to assert a first comparator output signal responsive to a sense resistor voltage being greater than an adaptive threshold voltage, wherein the sense resistor voltage is produced by a primary current through a sense resistor;
    a second comparator configured to assert a second comparator output signal responsive to the sense resistor voltage being greater than a peak primary current threshold voltage, wherein the adaptive threshold voltage equals the peak primary current threshold voltage minus an offset;
    a voltage threshold time detector configured to time a threshold time starting from the assertion of the first comparator output signal and ending at the assertion of the second comparator output signal; and
    a controller for controlling a cycling of a power switch to regulate an output voltage of the flyback converter, wherein the controller is configured to cycle off the power switch responsive to the assertion of the second comparator output signal; and wherein the controller is further configured during a continuous conduction mode to:
        determine a voltage gradient over time of the sense resistor voltage from the threshold time, and
        determine an input voltage to the flyback converter from the voltage gradient over time and a magnetizing inductance of a transformer for the flyback converter.

2. The universal input voltage detection system of claim 1, wherein the controller is further configured, in each cycle of the power switch, to:
    utilize a slope compensation technique that reduces the peak primary current threshold voltage during a slope compensation period according to a slope profile;
    in response to the assertion of the second comparator output signal after a beginning of the slope compensation period, measure a slope time that is equal to a difference between the beginning of the slope compensation period and the assertion of the second comparator output signal;
    determine a minimum time value equal to a minimum of the slope time and the threshold time;
    determine a product of the minimum time value and the slope profile;
    determine a difference between the offset and the product; and
    determine the voltage gradient over time using a ratio of the difference and the threshold time.

3. The universal input voltage detection system of claim 2, wherein slope time is greater than the threshold time.

4. The universal input voltage detection system of claim 2, wherein slope time is less than the threshold time.

5. The universal input voltage detection system of claim 1, wherein the controller is further configured, in each cycle of the power switch, to:
    utilize a slope compensation technique that reduces the peak primary current threshold voltage during a slope compensation period according to a slope profile;
    in response to the assertion of the second comparator output signal after a beginning of the slope compensation period, determine the voltage gradient over time using a ratio of the offset and the threshold time.

6. The universal input voltage detection system of claim 1, wherein the controller is further configured to set the offset to a default value during an initial operation of the flyback converter.

7. The universal input voltage detection system of claim 6, wherein the controller is further configured to adjust increase the offset from the default value responsive to a difference between a turn-on duration for the power switch and the threshold time being less than or equal to a blanking time.

8. The universal input voltage detection system of claim 6, wherein the controller is further configured to maintain the offset at the default value responsive to a difference between a turn-on duration for the power switch and the threshold time being greater than or equal to a blanking time plus a hysteresis time.

9. The universal input voltage detection system of claim 2, wherein the controller is further configured to adjust a switching frequency of the power switch during a pulse frequency mode of operation.

10. The universal input voltage detection system of claim 2, wherein the controller is further configured to adjust the peak primary current threshold voltage during a pulse width modulation mode of operation.

11. The universal input voltage detection system of claim 10, wherein the controller is further configured to adjust the peak primary current threshold voltage during the pulse width modulation mode of operation in response to a feedback signal derived from the output voltage of the flyback converter.

12. A method for universal input voltage detection of a flyback converter comprising:
    while operating the flyback converter in a continuous conduction mode:
    switching on a power switch to conduct a primary-winding current through a sense resistor to develop a sense resistor voltage across the sense resistor;
    measuring a threshold time beginning when the sense resistor voltage equals an adaptive threshold voltage and ending when the sense resistor voltage equals a peak primary current threshold voltage, wherein the adaptive threshold voltage equals the peak primary current threshold current minus an offset; and
    determining a voltage gradient over time of the sense resistor voltage from the threshold time; and
    determining an input voltage from a product of the voltage gradient over time and a magnetizing inductance of a transformer.

13. The method of claim 12, further comprising switching off the power switch responsive to the sense resistor voltage equaling the peak primary current threshold.

14. The method of claim 12, further comprising setting the offset to a default value during an initial period of operation for the flyback converter.

15. The method of claim 12, further comprising:
subsequent to the switching on of the power switch, reducing the peak primary current threshold voltage during a slope compensation period according to a slope profile; and
in response to the sense resistor voltage equaling the peak primary current threshold voltage prior to a beginning of the slope compensation period, determining the voltage gradient over time of the sense resistor voltage by dividing the offset by the threshold time.

16. The method of claim 12, further comprising:
subsequent to the switching on of the power switch, reducing the peak primary current threshold voltage during a slope compensation period according to a slope profile;
in response to the sense resistor voltage equaling the peak primary current threshold voltage after a beginning of the slope compensation period, measuring a slope time that is equal to a difference between the beginning of the slope compensation period and when the sense resistor voltage equals the peak primary current threshold voltage;
determining a minimum time value equal to a minimum of the slope time and the threshold time;
determining a product of the minimum time value and the slope profile;
determining a difference between the offset and the product; and
determining the voltage gradient over time of the sense resistor voltage using a ratio of the difference and the threshold time.

17. The method of claim 16, wherein the minimum time value is equal to the slope time.

18. The method of claim 16, wherein the minimum time value is equal to the threshold time.

19. The method of claim 12, further comprising increasing the offset to be greater than a default value responsive to a difference between a switch turn-on duration for the power switch and the threshold time being less than or equal to a blanking time.

20. The method of claim 12, further comprising setting the offset to equal a default value responsive to a difference between a switch turn-on duration for power switch and the threshold time being greater than or equal to a blanking time plus a hysteresis time.

* * * * *